United States Patent [19]

Kujawski

[11] 4,283,041

[45] Aug. 11, 1981

[54] METERING VALVE

[76] Inventor: Edmund Kujawski, 8 Coleridge Pl., Greenlawn, N.Y. 11740

[21] Appl. No.: 129,087

[22] Filed: Mar. 10, 1980

[51] Int. Cl.³ .............................................. F16K 47/04
[52] U.S. Cl. ................................... 251/205; 251/274; 251/335 B
[58] Field of Search ..................... 251/205, 335 B, 274

[56] References Cited

U.S. PATENT DOCUMENTS

| | | | |
|---|---|---|---|
| 2,899,980 | 8/1959 | Loebel et al. | 251/205 X |
| 3,139,262 | 6/1964 | Morris et al. | 251/205 |
| 4,214,730 | 7/1980 | Baumann | 251/205 X |

Primary Examiner—Arnold Rosenthal

[57] ABSTRACT

A metering valve for regulating a gas flow rate comprises a valve body having first and second inner chambers. A transverse wall portion is disposed between the first and second inner chambers and has a passageway extending therethrough to provide communication between the first and second inner chambers. Inlet and outlet ports are located in the valve body and are in communication with the first and second inner chambers, respectively. A valve seat is disposed in the passageway and has a cylindrical orifice extending therethrough. A valve stem having a groove thereon cooperates with the valve seat whereby axial movement of the stem regulates the gas flow rate between the first and second chambers. A torque reduction structure is provided for decreasing the torque required to move the valve stem whereby precise settings of the gas flow rate can be achieved.

4 Claims, 1 Drawing Figure

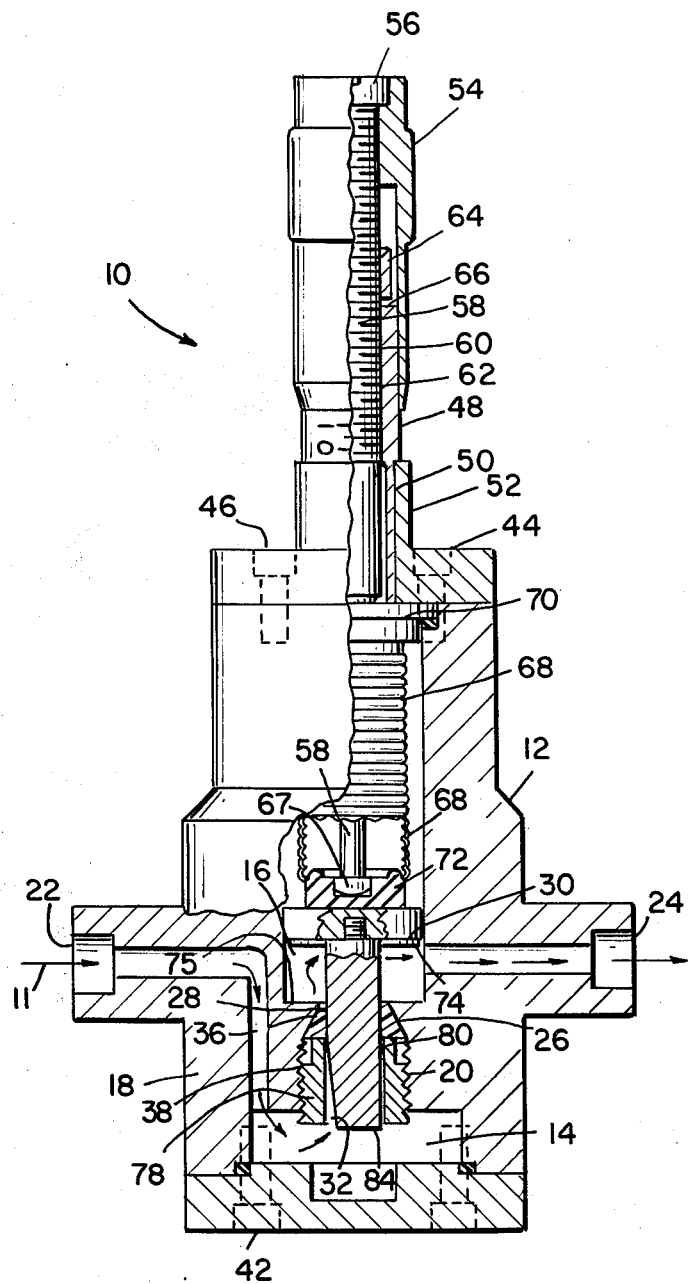

METERING VALVE

BACKGROUND OF THE INVENTION

While the invention is subject to a wide range of applications, it is especially suited for use in a valve system and will be particularly described in that connection.

In metering minute amounts of gas from a high pressure to a low pressure area, very precise valve devices are required. The valve must be capable of accurately controlling the entrance of minute quantities of gas in to a vacuum where a quantity of gas admitted may be a fraction of a cc or even smaller amounts approaching molecular quantities. This can be especially difficult where the inlet port is of a much higher pressure than the outlet port as where the gas at atmospheric pressure is introduced into a vacuum.

In the past, this has been accomplished by a precision metering valve of the type disclosed in U.S. Pat. No. 3,139,262 to Morris et al, which discloses for example "micrometer means for manually controlling the rate of flow through a valve body with high rate of precision". Also, a precision metering valve similar to the type disclosed in the present invention has been made and sold in this country. However, a problem has existed in that substantial torque is required to adjust the valve. Thus, the precision control provided by a micrometer on the valve is relatively difficult to precisely adjust.

It is an object of the present invention to provide a metering valve which can precisely meter a gas flow.

It is a further object of the present invention to adjust.

SUMMARY OF THE INVENTION

Accordingly, there has been provided a metering valve for regulating a gas flow rate comprising a valve body having first and second inner chambers. A transverse wall portion is disposed between the first and second inner chambers and has a passageway extending therethrough to provide communication between the first and second inner chambers. Inlet and outlet ports are located in the valve body and are in communication with the first and second inner chambers, respectively. A valve seat is disposed in the passageway and has a cylindrical orifice extending therethrough. A valve stem having a groove thereon cooperates with the valve seat whereby axial movement of the stem regulates the gas flow rate between the first and second chambers. A torque reduction structure for decreasing the torque required to move the valve stem whereby precise settings of the gas flow rate can be achieved.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

FIG. 1 is a side view, partly in cross-section, of a precision metering valve in accordance with the present invention.

DESCRIPTION OF THE PREFERRED EMBODIMENT OF THE INVENTION

A metering valve 10 for regulating a gas flow rate 11 comprises a valve body 12 having first and second inner chambers 14 and 16. A transverse wall portion 18 is disposed between the first and second inner chambers 14 and 16. The wall portion has a passageway 20 extending therethrough to provide communication between the first and second inner chambers 14 and 16. An inlet port 22 and an outlet port 24 in the valve body 12 are in communication with the first and second inner chambers 14 and 16 respectively. A valve seat 26 is disposed in the passegeway and has a cylindrical orifice 28 extending therethrough. A valve stem 30 has a groove 32 thereon and cooperates with the valve seat whereby axial movement of the stem regulates the gas flow rate through a preset range between the first and the second chambers. Torque reduction structure 34 decreases the torque required to move the valve stem whereby precise settings of the gas flow rate can be achieved.

Referring to FIG. 1, there is illustrated a metering valve 10 which is comprised of a cylindrical valve body 12 having first and second inner chambers 14 and 16. The inner chambers may preferably be cylindrical. A transverse wall portion 18 is disposed between the first and second inner chambers. The wall portion has a passageway 20 including a tapered section 36 adjacent the second inner chamber. A second threaded portion 38 of the passageway extends from the tapered section to the first inner chamber 14.

A bottom bonnett 40 closes off the inner chamber 14. The bonnet is affixed to the valve body 12 by a series of screws (not shown) which extend through holes 42. The other end of the valve body 12 is closed off by a top bonnett 44 which is affixed to the body 12 by a series of screws (not shown) which are affixed through hole 46.

A micrometer device extends outside of the valve body and passes through the top bonnett 44 and includes a fixed sleeve 48 which is affixed into a passageway 50 which extends through a collar 52 of the top bonnett 44. A thimble 54 is adapted to be rotated on the fixed sleeve 48. A screw 56 passes through the thimble and is connected into a plunger 58. The plunger 58 has a threaded portion 60 which cooperates with a threaded section 62 of the fixed sleeve 48. Also, a lock nut 64 is threaded onto the threads of the screw 56. Thus, the rotation of the thimble 54 has the effect of moving the plunger 58 downward until the lock nut is stopped against the top edge 66 of the fixed sleeve 48. The plunger 58 may extend into the valve body and has an enlarged cylindrical element 67 rotably attached at the bottom of the plunger.

A bellows assembly 68 is axially disposed within the chamber 16 and affixed at one end 70. The other end of the bellows assembly includes a valve plug 72. The cylindrical element 67 of the plunger 58 is adapted to move the bellows assembly 68 and plug 72 up and down within the valve cylinder depending on the direction of rotation of the plunger 58.

A conventional seal 74 such as an O-ring is affixed to the bottom of the valve plug 72. This seal seats on the top surface 75 of the transverse wall 18. The seal prevents any gas flow from the first inner chamber to the second inner chamber when the plug is fully contacting the top surface 74. Thus seal 74 assures complete shut-off of the gas flow.

A seat 76 is located within the tapered section 36. The seat has an outward configuration conforming to the tapered section 36 and a cylindrical orifice 28 extending therethrough. A compression nut 78 is threaded into the passageway 20 of the transverse wall and forces the valve seat 26 against the tapered section 36 to cause the cylindrical surface of orifice 28 to press against the valve stem 30. The compression nut has a central passageway 80 which receives the valve stem. Also, the central passageway delivers the gas flow from the first chamber 14 to the second chamber 16.

In the past, some problems were encountered during the compression of the valve seat 26 by the compression nut. The valve stem 30 was generally approximately 0.25 inches in diameter. A great deal of force was required to compress the valve seat enough whereby the cylindrical surface of orifice 28 would contact the valve stem and prevent leakage from the first inner chamber 14 to the second inner chamber 16.

The present invention employs the torque reduction device of decreasing the diameter of the valve stem whereby less force is exerted against the valve seat since the cylindrical surface of orifice 28 is also of a smaller diameter. Therefore, it is easier to assemble the metering valve. Also, since the seat is subject to less force, its life expectancy may increase.

The valve stem 30 has a threaded portion 82 on one end which is screwed into the valve plug 72. A tapered groove 32 is formed longitudinally on the shaft. The groove increases in depth and has the minimal depth near the base portion of the shaft adjacent the valve plug 72 and the maximum depth at the terminal portion 84 of the shaft. As explained above, the diameter of the shaft 30 makes a very close fit with the cylindrical surface 28 formed within the valve seat 26. The tapered groove provides a passage for gas entering the inlet port 22 to pass out through the outlet port 24. The rate of groove taper per unit length is preselected to provide the desired ratio of rotation of the shaft stem to gas flow. Rotation is controlled by the micrometer assembly mentioned above. The rotation of the thimble 54 causes the tapered groove to pass the top of the valve seat 26 and permit the flow of the gas. There is a full range of control of the leak rate of gas through the groove from the completely shut-off position to the full flow rate position.

An important aspect of the present invention lies in the torque reduction device. This provides for decreasing the torque required to move the valve stem so that precise settings of the gas flow rate can be achieved. This control is very important and has prooved to be somewhat difficult to obtain because of the torque required to turn the thimble 54 of the micrometer device. Until now, the valve stem has generally been 0.25 inches in diameter. However, it has now been found that by decreasing the diameter of the valve stem to 0.125 inches, the torque required to turn the thimble has decreased more than 50%. The reason for this tremendous decrease in torque is because the surface area of the valve stem which is in contact with the cylindrical surface of orifice 28 is greatly reduced and therefore the force to move the valve stem in the valve seat correspondingly reduces. Although the valve stem is preferably made of a diameter of 0.125 inches, it is within the scope of the present invention to form it from 0.093 inches to 0.1252 inches. In addition, as previously mentioned, the reduction in diameter of the valve stem provides an advantage in that the valve seat is more easily assembled within the valve body and may have an increased life expectancy.

It can thus be appreciated that there has been provided a metering valve which can precisely meter a gas flow and is relatively easy to adjust.

While there has been described what is at present considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

I claim:
1. A metering valve for regulating a gas flow rate comprising:
  (a) a valve body having first and second inner cylindrical chambers;
  (b) inlet and outlet ports in said valve body in communication with said first and second inner cylindrical chambers respectively;
  (c) a transverse wall portion between said first and second inner chambers, said wall portion having a passageway extending therethrough to provide communication between the first and second inner chambers, said passageway having a first section being partially threaded and a second tapered section adjacent said first section;
  (d) a valve seat disposed in said passageway having a cylindrical orifice extending therethrough, and an external configuration conforming to said tapered section;
  (e) a valve stem having a groove thereon to cooperate with said valve seat, said groove being tapered and extending longitudinally on said shaft, said groove increasing in depth at a pre-selected rate per unit-length with the maximum depth being at a base end of said shaft, whereby axial movement of said stem regulates the gas flow rate through a preset range between said first and second chambers;
  (f) torque reduction means comprising a cylindrical valve stem having a diameter from 0.093–0.1252 inches for decreasing the torque required to move the valve stem, whereby precise settings of the gas glow can be achieved;
  (g) a bellows disposed in said second chamber concentric with said valve stem, a plug portion disposed on one end of said bellows to abut said transverse wall portions and close said passageway when said bellows is in the extended position;
  (h) micrometer means extending outside of said valve body for moving said valve stem in the axial direction.

2. The metering valve of claim 1 wherein a closure member has a central passageway and is affixed in said first section for securing said valve seat against said tapered section.

3. The metering valve of claim 2 wherein said closure member receives said valve stem in the central passageway and said central passageway delivers the gas flow from the first chamber to the second chamber.

4. The metering valve of claim 3 wherein circular seal means are on said plug portion to abut said transverse wall.

* * * * *